(12) United States Patent
Rollend

(10) Patent No.: US 10,703,024 B2
(45) Date of Patent: Jul. 7, 2020

(54) EBM EPET CONTAINER DROP-IMPACT ENHANCEMENT

(71) Applicant: DAK AMERICAS LLC, Charlotte, NC (US)

(72) Inventor: George F. Rollend, Charlotte, NC (US)

(73) Assignee: DAK AMERICAS LLC, Charlotte, NC (US)

( * ) Notice: Subject to any disclaimer, the term of this patent is extended or adjusted under 35 U.S.C. 154(b) by 789 days.

(21) Appl. No.: 15/570,592

(22) PCT Filed: Apr. 13, 2015

(86) PCT No.: PCT/US2015/025539
§ 371 (c)(1),
(2) Date: Oct. 30, 2017

(87) PCT Pub. No.: WO2015/157754
PCT Pub. Date: Oct. 15, 2015

(65) Prior Publication Data
US 2018/0141244 A1    May 24, 2018

Related U.S. Application Data

(60) Provisional application No. 61/978,389, filed on Apr. 11, 2014.

(51) Int. Cl.
*B29C 37/00* (2006.01)
*B29C 49/48* (2006.01)
(Continued)

(52) U.S. Cl.
CPC ........ *B29C 37/0053* (2013.01); *B29C 48/002* (2019.02); *B29C 48/0017* (2019.02); *B29C 48/09* (2019.02); *B29C 49/48* (2013.01); *B29C 48/30* (2019.02); *B29C 48/32* (2019.02); *B29C 48/325* (2019.02); *B29C 48/34* (2019.02); *B29C 49/0005* (2013.01); *B29C 49/04* (2013.01);
(Continued)

(58) Field of Classification Search
USPC .................................................. 215/371, 373
See application file for complete search history.

(56) References Cited

U.S. PATENT DOCUMENTS

| 5,522,519 A | 6/1996 | Bergner et al. |
| 6,033,724 A | 3/2000 | Molitor |

(Continued)

FOREIGN PATENT DOCUMENTS

| RU | 15 712 U1 | 11/2000 |
| RU | 2 470 843 C2 | 12/2012 |

OTHER PUBLICATIONS

Donald V. Rosato et al, Blow Molding Handbook, 1988, Oxford University Press, pp. 104-106 and 287. (Year: 1988).*

(Continued)

*Primary Examiner* — Robert B Davis
(74) *Attorney, Agent, or Firm* — Oblon, McClelland, Maier & Neustadt, L.L.P.

(57) ABSTRACT

A method for improving the impact resistance of an extrusion blow molded article by extrusion blow molding an ultra-high IV polymer resin having an IV of at least 0.9 dL/g, wherein the extrusion blow molding is carried out in a mold with a texturized base surface such that a base surface of the extrusion blow molded article is textured.

19 Claims, 9 Drawing Sheets

(51) Int. Cl.
  B29C 48/00 (2019.01)
  B29C 48/09 (2019.01)
  B29C 48/30 (2019.01)
  B29C 48/32 (2019.01)
  B29C 49/00 (2006.01)
  B29L 31/00 (2006.01)
  B29C 49/04 (2006.01)
  B29C 48/325 (2019.01)
  B29C 48/34 (2019.01)

(52) U.S. Cl.
  CPC ............... *B29C 2049/4897* (2013.01); *B29L 2031/7158* (2013.01); *B29L 2031/7172* (2013.01)

(56) References Cited

U.S. PATENT DOCUMENTS

| | | | |
|---|---|---|---|
| 6,808,820 | B2 | 10/2004 | Lee et al. |
| 7,150,371 | B1 | 12/2006 | Larson et al. |
| 7,390,187 | B2 | 6/2008 | Larson et al. |
| 8,556,621 | B2 | 10/2013 | Sequeira |
| 2003/0116527 | A1* | 6/2003 | Beaver ............... B65B 65/06 215/382 |
| 2004/0071936 | A1* | 4/2004 | Martelli ............... B29C 33/424 428/141 |
| 2005/0230877 | A1* | 10/2005 | Readdy ............... B24C 1/06 264/219 |
| 2006/0065566 | A1 | 3/2006 | Steih |
| 2008/0182102 | A1 | 7/2008 | Sano et al. |
| 2010/0326994 | A1* | 12/2010 | Ichikawa ............... B29B 11/08 220/675 |
| 2011/0256331 | A1* | 10/2011 | Codd ............... C08G 63/80 428/35.7 |
| 2012/0276314 | A1 | 11/2012 | Latz et al. |
| 2013/0180998 | A1* | 7/2013 | Nakayama ............ B65D 1/0284 220/609 |
| 2013/0183470 | A1 | 7/2013 | Codd et al. |
| 2015/0041426 | A1* | 2/2015 | Oguchi ............... B65D 1/0223 215/382 |

OTHER PUBLICATIONS

International Search Report dated Jul. 8, 2015 in PCT/US2015/025539 Filed Apr. 13, 2015.
International Preliminary Report on Patentability with Written Opinion dated Oct. 12, 2016 in PCT/US2015/025539 Filed Apr. 13, 2015.
Office Action dated Apr. 15, 2019 in Russian Patent Application No. 2017139089/04 (with English translation).
Combined Russian Office Action and Search Report dated Oct. 15, 2018 in corresponding Russian Patent Application No. 2017139089/04(068142) (with English Translation and English Translation of Category of Cited Documents), 16 pages.
Extended European Search Report dated Oct. 28, 2019, in Patent Application No. 15776835.9, 12 pages.
Rosato, D. V., "Designing and Manufacturing of Molds/Dies", Blow Molding Handbook, XP000371976, Jan. 1, 1976, 84 pages.

* cited by examiner

Grit Size Conversion for AO and SIC

| Grit Size | Inches (average) | Micronts (average) |
|---|---|---|
| 16 | 0.043 | 1092 |
| 20 | 0.037 | 942 |
| 24 | 0.027 | 686 |
| 30 | 0.022 | 559 |
| 36 | 0.019 | 443 |
| 46 | 0.014 | 356 |
| 54 | 0.012 | 305 |
| 60 | 0.010 | 254 |
| 70 | 0.008 | 203 |
| 80 | 0.0065 | 165 |
| 90 | 0.0057 | 145 |
| 100 | 0.0048 | 122 |
| 120 | 0.0048 | 102 |
| 150 | 0.0035 | 89 |
| 180 | 0.0030 | 76 |
| 220 | 0.0025 | 63 |

*Fig. 9*

EBM EPET CONTAINER DROP-IMPACT ENHANCEMENT

BACKGROUND OF THE INVENTION

Field of the Invention

The invention relates to a method for improving the drop-impact resistance of extrusion blow molded (EBM) articles, particularly poly(ethylene terephthalate) (PET) containers and containers obtained from ultra-high intrinsic viscosity (IV) PET resins, and articles obtained by said method.

Description of the Related Art

Polyester resins including resins such as poly(ethylene terephthalate) (PET), poly(butylene terephthalate) (PBT), poly(ethylene naphthalate) (PEN), poly(trimethylene terephthalate) (PTT), and poly(trimethylene naphthalate) (PTN), are conventionally used as resins in the manufacture of containers such as beverage containers. Properties such as flexibility, impact resistance, and transparency, together with good melt processability, permit polyester resins to be widely used for this application. The term resin as it is used herein includes all of the aforementioned materials.

Because of the challenge of achieving high melt strength with PET based polyesters in a cost effective, time-efficient manner, and due to the increased crystallinity that often results from the thermal history, PET resins have typically been limited to use in injection stretch blow molding to prepare articles such as water bottles or carbonated soft drink bottles or other thin wall containers. Conversely, thicker walled articles, such as "handleware," have typically been formed by extrusion blow molding (EBM) with PETG copolymer, polyvinyl chloride (PVC), polyethylene (PE), or polypropylene resins, in part, due to the ability to achieve high enough IV and melt strength with the requisite characteristics, at acceptable cost. "Handleware" is the term used for thicker walled containers, (thickness of container wall being 16-55 mils) such as juice, milk, or laundry detergent containers, and other such containers typically having integrated handles (with handles typically having thickness of 17-40 mils).

There is a desire to provide PET polyester resins that can be used to produce "handleware" through EBM, in place of PETG copolymer, polyvinyl chloride (PVC), polyethylene (PE), polypropylene (PP), polycarbonate (PC), or polystyrene (PS), with comparable or better costs and providing clearer and colorless containers (which cannot be readily produced with some other materials). PET polyester produced specifically for EBM applications is known as ePET and typically has much higher IV and melt strength than conventional PET for small, thin-walled containers.

A very important characteristic of these larger EBM ePET containers (both with and without handles) is the drop-impact performance. Drop-impact performance is typically described as the height from which a container filled with contents can survive a free fall onto a hard flat surface, and is tested at both ambient conditions and refrigerated conditions of 35-45° F. Typically, the expectations of container drop-impact range from 2-3 feet with greater than 90% container survival.

The drop-impact performance depends not only on the physical properties of the resin, but also on the design of the base section of the container or bottle. The vast majority of all drop-impact failures occur in the base section of the container or bottle, especially with ePET containers or bottles.

The design of a typical extrusion blow molded (EBM) container base section requires a relatively shallow base to eliminate the need for an independent base pushup device. A rocker relief is built into the base section to create independent contact sections rather than having a continuous contact surface along the base chime section. This shift in the geometry creates angles and various geometric surfaces of which the interfaces can create stress risers in the smooth plastic surface.

The shallow base insert is designed with a 'relief' area to protect the pinch-off or seam of the container from contacting the standing surface such that direct impact to the pinch off is prevented during drop impacts. The hardened plastic pinch-off or seam is a stress riser in the formed base pushup and can have a ragged edge when the tail scrap is removed during container trimming.

Typically, embossing characters and symbols are incorporated in the base pushup in an EBM container to depict the cavity number, recycle code, manufacturer's code, and other alpha numeric characters for logos. These different geometries can create additional stress risers in the plastic throughout the base section including the chime of the container caused by the corners and edges of these geometries on the otherwise smooth continuous plastic surface.

During EBM with highly polished molds, air may become trapped between the mold walls and the soft, hot resin and result in marring of its surface by entrapped air. This effect is more evident with thick-walled, large objects; requiring the mold to be vented. Thus, part-line slot vents, pin hole, and plug venting are another typical feature of EBM containers. These various venting techniques allow air to be evacuated quickly from the mold space as the plastic inflates during EBM, thereby allowing for a smooth surface and contact with the mold without trapping air. However, these venting techniques create "witness lines" on the smooth plastic surface of the blown container, which result in additional stress risers.

Another venting technique sandblasts the walls of the mold to provide a matte surface so that the air may be quickly evacuated. Sandblasting has been performed on olefin type molds; however, where a glass-clear material is being processed or a specific surface brilliance is required, the blow mold is polished rather than sandblasted since any texture on the surface of the mold is transferred the texturing to the surface of the finished article. That is, a glass-like or transparent appearance is typically precluded where the surface of the mold (and thus, the container surface) is sandblasted or textured. As a result, the clear polymers such as PC, PVC, PS and PET require a polished mold cavity for the best glass like surface, as any texturing on the blow mold will be reproduced on surface of the plastic container and impair the glass like appearance.

Other than venting, sandblasting or texturing of plastic containers and molds has only been utilized for aesthetic purposes. For aesthetic purposes, the sandblasting or texturing is performed only on the portions of the mold that represent the readily visible portions of the containers as it is for decoration purposes, such as presenting a frost like surface in conjunction with the glass like clear surface. But a grit sandblasted finish on the clear polymers is not normally desirable and obviates the visual benefit of employing a clear polymer. And, as noted above, the other venting techniques for clear polymers result in an additional source of stress risers.

Overall, due to the multitude of stress risers that can lead to drop-impact failures, there is a need to improve the drop-impact resistance of EBM containers and bottles, especially containers and bottles obtained from ultra-high intrinsic viscosity (IV) resins such as ultra-high IV PET resins.

SUMMARY OF THE INVENTION

Accordingly, one object of the invention is to provide a method for neutralizing or minimizing the contribution of these stress risers, from all potential sources, which may contribute to the initiation of drop-impact failure. The stress risers are neutralized or minimized by sandblasting or otherwise texturing the mold surface of the base section, including any embossments thereon, which softens the stress risers by smoothing out any sharp edges. More specifically, sandblasting or texturing the mold base section (and therefore the EBM container base surface) creates radii on all sharp corners/edges created from embossing or intersection of the various geometric surfaces. Consequently, this softening technique reduces any stress concentration by allowing the resin, such as ePET resin, forming the container base to bend across a radius (or multiple radii) versus bending across sharp corners and/or intersections of an un-textured container.

Another object of the invention is applying a sand blasted finish on the full base insert section of the container mold and therefore the container or bottle, including the chime area, to reduce these initiation points (stress risers) of drop impact failures in the container's base area, thereby leading to an enhanced drop-impact performance of the filled container under both ambient and refrigerated conditions.

Another object is of the invention is to provide EBM handleware and non-handleware containers that have neutralized or minimized stress risers, and thus, an improved drop-impact resistance, by performing the EBM process in a mold having a sand blasted finish on the full base insert section of the container mold and therefore the container, including the chime area.

These and other objects of the invention have been satisfied, either individually or in combinations thereof, by the discovery of a method for improving the drop-impact resistance of an EBM container or bottle by sandblasting or texturing the base section of the mold surface, such that any stress risers in the base of the resulting EBM container or bottle are neutralized or minimized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 shows a grit size conversion chart for aluminum oxide (AO) and silicon carbide (SiC).

DETAILED DESCRIPTION OF THE PREFERRED EMBODIMENTS

The present invention relates a method for improving the drop-impact resistance of extrusion blow molded (EBM) articles, preferably poly(ethylene terephthalate) (PET) containers and bottles obtained from ultra-high intrinsic viscosity (IV) PET resins, and articles obtained by the method.

Conventionally, a resin preform is transformed to a bottle or a container by blow-molding. Blow molding, also known as blow forming, is a manufacturing process by which hollow plastic parts are formed. It is a process used to produce hollow objects from thermoplastic. In general, there are three main types of blow molding: extrusion blow molding, injection blow molding, and stretch blow molding. The blow molding process begins with melting down the plastic pellets and forming a parison or preform. The parison is a tube-like piece of plastic with a hole in one end in which compressed air can pass through.

The basic process has two fundamental phases. First, a preform (or parison) of hot plastic resin, often in a somewhat tubular shape, is created. Second, a pressurized gas, usually air, is used to expand the hot preform and press it against a mold cavity. The pressure is held until the plastic cools below the glass transition point ($T_g$). This action identifies another common feature of blow molded articles. Part dimensional detail is better controlled on the outside than on the inside, where material wall thickness can alter the internal shape. Once the plastic has cooled and hardened the mold opens up and the part is ejected.

Figure 1A:
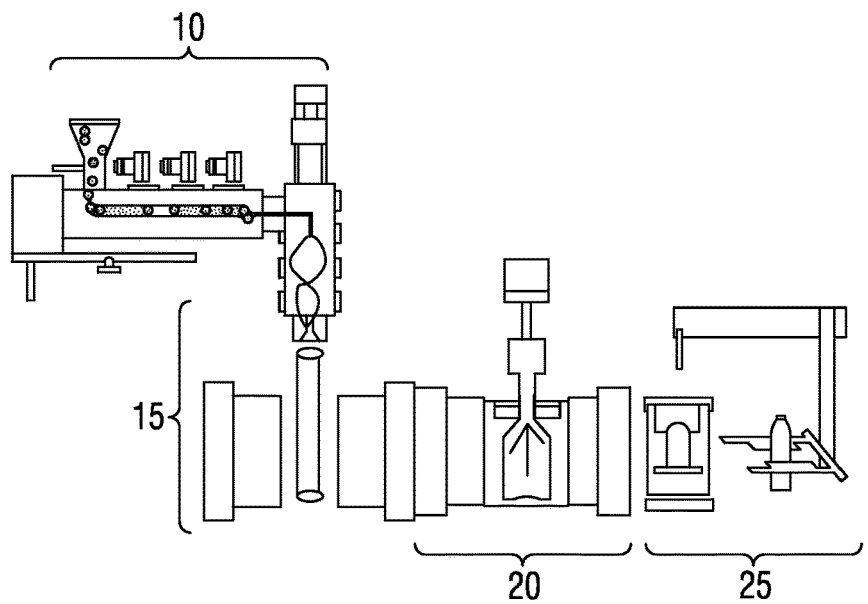
FIG. 1A shows a schematic of a typical extrusion blow molding (EBM) process.

The EBM process is a common process for producing plastic containers, particularly large plastic containers with handles. The basic extrusion blow molding process is shown in FIG. 1A, and comprises plasticizing or melting of the resin in an extruder (10), forming the parison by extrusion of the molten resin through a die-head into a mold (15), blowing the parison to fit the shape of the container mold and cooling (20), and then de-flashing of the blown container and ejection of the finished article (25). Variations can include multiple extruders for co-extrusion of two or more materials for multilayer container structures, parison programmer to shape the parison to match complex blown article shapes and wall thickness, and multiple mold clamp systems to improve output through the use of multiple molds.

In the EBM process, an extruder melts, mixes, and feeds a homogeneous molten polymer into a die-head that forms the molten hollow plastic tube, called a parison, used in blowing hollow containers or other hollow articles. The first step is extrusion of a hollow plastic parison which is usually in a downward direction for making containers and/or an upward direction on some extrusion wheel platforms. Next, the two halves of the mold close on the parison, capturing it as it is cut off from the extruder by a cold or heated cut-off knife. A blow pin or a needle is inserted and air is blown into the mold, expanding the parison. In some cases the blown pin cooled by water, assists in forming the thread finish by compressing the thread finish section into the mold (neck calibration), rather than simply blowing it in. This results in a smooth interior in the finish region. In the needle blow case, the needle is inserted into a part of the molded object that is trimmed off forming the final container shape, and the inside of the finish is formed only by air. The mold is cooled, usually with water, to solidify the plastic. When the container is cool enough to maintain its shape, it is ejected from the mold.

The flash is trimmed from the container neck and bottom, as well as from other areas that are pinched off, for instance to form handles or offset necks. The mark left from the removal of the flash serves as an easy means for identification of extrusion blow-molded containers. Usually, this is easiest to see on the bottom of the container. It typically appears as a rough area along the mold parting line or seam, centered in the middle of the bottom and running half or so of the distance to the heel of the container. It is also possible, on careful examination, to identify the roughness at the top of the finish, or on other areas where flash was trimmed.

The flash, after being trimmed, is usually granulated in a closed-loop fashion with the extruder and is immediately fed back into the drying hoppers on the extruder at a controlled rate through weigh blenders, mixed with the virgin resin. The use of regrind can be problematic for heat-sensitive resins like PVC, especially if the proportion of the flash is high. However, with the present invention ultra-high IV PET, there is no practical limit for regrind levels because it is a thermally stable resin.

There are two main categories of extrusion blow molding processes: continuous and intermittent. The process of extruding a parison can be continuous or intermittent. In continuous EBM, the parison is extruded continuously and the individual parts are cut off by a suitable knife. Types of equipment for continuous EBM may be categorized as follows: rotary wheel blow molding systems and shuttle machinery. Continuous extrusion is preferred for most packaging applications. It provides higher productivity and reduces thermal degradation, since the melt is not held up. Examples of parts made by the EBM process include dairy containers, shampoo containers, hoses/pipes, and hollow industrial parts such as drums.

Intermittent extrusion blow molding may be also called shot extrusion. Intermittent extrusion is commonly used for the production of very large blown containers where a large parison must be produced in a very short time and in the production of gasoline tanks for automobiles. Parison shot extrusion is accomplished by means of a reciprocating screw similar to those used in injection molding machines. In intermittent blow molding there are two main types of processes: straight intermittent is similar to injection molding whereby the screw turns, then stops and pushes the melt out. With the accumulator method, an accumulator gathers melted plastic and when the previous mold has cooled and enough plastic has accumulated, a rod pushes the melted plastic and forms the parison. In this case the screw may turn continuously or intermittently.

As the extrudate leaves the die, parison drawdown can occur. The stress exerted by the parison's own weight tends to collapse the parison walls and create axial thinning of the walls, thus creating thin spots in the final part. Ultra-high IV PET prevents this drawdown from occurring, and thus prevents axial thinning of the walls.

Figure 1B:
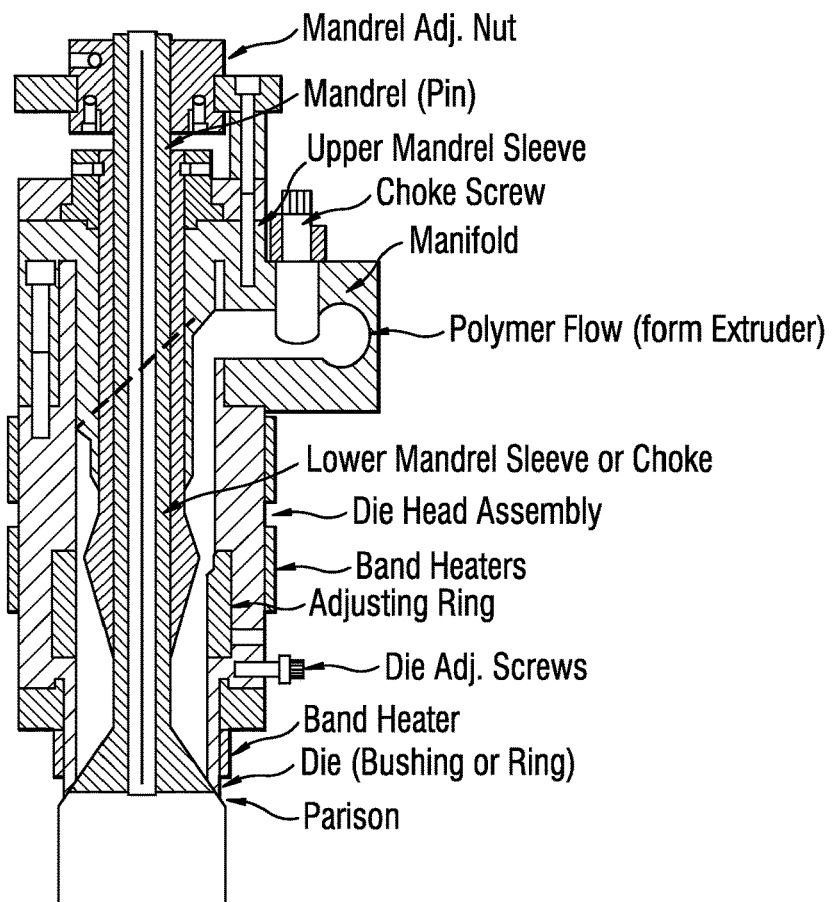
FIG. 1B shows a programmable EBM die-head with pin and bushing tooling is shown in FIG. 1B.

The extrusion of the polyester resin to form the EBM parison may be carried out under different conditions. Preferably, extrusion is carried out with an EBM apparatus that is capable of completely melting the polyester resin and having sufficient pressure to rapidly extrude the molten resin through a die-head through pin and bushing tooling and programmed into the desired parison shape and wall thickness profile. A typical programmable EBM die-head with pin and bushing tooling is shown in FIG. 1B. The extruder portion of such a molding apparatus may contain a plurality of heating zones. The temperature of each heating zone is independently controlled. The number of heating zones is not limited, preferably, the number of heating zones is 4 or more, more preferably 5 or more, more preferably 6 or more, more preferably 7 or more, more preferably 8 or more, even more preferably 9 or more, most preferably 10 or more. Each heating zone is capable of heating the polyester resin to a temperature above the melting temperature of the polyester resin. The temperature of any zone may vary from, for example, 400 to 600° F., preferably from 450 to 550° F., more preferably from 475 to 525° F., most preferably about 500° F. Any of the aforementioned temperatures may be varied by any increment of, for example, 2, 4, 6, 8 or 10° F., or any multiple thereof.

The screw speed of an EBM apparatus used to carry out the molding may be varied as needed to adjust cycle time and other factors of the extrusion process. For example, the screw speed may be from 5 to 100 rpm, preferably from 10 to 80 rpm, more preferably from 20 to 60 rpm, more preferably from 30 to 50 rpm, more preferably about 40 rpm. The screw speed may be varied in any increment of 1, 2, 4, 6, 8 and 10 rpm within any of the aforementioned ranges, or any multiple thereof.

The head pressure of the extrusion process may be varied and may range from 0 to 3500 psig, preferably from 300 to 1500 psi, more preferably from 800 to 1200 psi. The cycle time is preferably less than 30 seconds, more preferably less than 20 seconds, and most preferably less than 10 seconds. The cycle time is the total time from clamp open to clamp open. The cycle time is usually defined by the following functions; mold close, blow air injection, hot-knife cut, mold shuttle, part cooling, mold open, part ejection, mold return, mold close. Simultaneously and within the same amount of time, resin is being melted into a liquefied state, the resin is undergoing plasticization and the molten resin (e.g., polymer melt) is continuously forming another parison in preparation for transfer into the mold space. One method includes feeding the resin into an extruder for melting and mixing within a heated extruder with a revolving screw that compresses and conditions the polymer as it changes phase from a solid to a liquid, the liquefied resin is then continuously extruded into a hollow parison which is subsequently captured into a mold. Since these actions may dependently coincide, a correlation can be drawn between the time of the cycle, and the time that the polymer is in the liquid phase. This correlation may differ from container parison to container parison and from mold to mold and from machine to machine.

During molding the container from the hot, molten parison following capture into the mold, the parison is expanded under pressure by a gas to fill the outer dimensions of the mold. During this blowing process the polyester resin may undergo significant stretching. Typically in EBM there is little or no axial stretch since the extruded parison is longer than the length of the mold in order to insure top and bottom capture into the mold. The hoop stretch ratio of the EBM container may be, for example, from 3 to 7 times, preferably from 3.5 to 6.5 times, more preferably from 4 to 6 times, most preferably from about 4.5 to about 5.5 times, even more preferably about 5 times.

As noted previously, EBM container drop-impact performance depends on the physical properties of the polymer resin, but also especially on the design of the base section of the container or bottle. The base section, especially in the case of an ePET container, is the location of the initiation points on a vast majority of all drop-impact container failures.

With respect to the polymer resin, the polymer resin of the present invention can be any resin that is capable of being extrusion blow molded, and is preferably an "ultra-high IV" resin, which refers to a polymer resin having an IV of 0.9 or higher, preferably 1.0 or higher, more preferably 1.1 or higher, most preferably 1.2 or higher, or even 1.3 or higher. Such ultra-high IV resins are also known in the art as high melt strength resins. Preferably, the "ultra-high IV" resin is a polyester resin, such as those mentioned above.

The measurement method for determining solution intrinsic viscosity (IV) of polyester (e.g., PET) resins is conventionally known. Solution IV can be measured at 0.50% concentration of the resin in a 60/40 (wt. %/wt. %) phenol/1,1,2,2-tetrachloroethane solution by means of a glass capillary viscometer. Conditions for measuring solution IV are described in ASTM D 4603-03 (approved on Mar. 10, 2003 and published in April 2003, incorporated herein by reference in its entirety). The solution IV of the co-barrier resins described herein can also be measured with the same method used to determine solution IV for polyester resins.

Polyester resins are generally made by a combined esterification/polycondensation reaction between monomer units of a diol (e.g., ethylene glycol (EG)) and a dicarboxylic acid (e.g., terephthalic acid (TPA)). The terms carboxylic acid and/or dicarboxylic acid, as used herein, include ester derivatives of the carboxylic acid and dicarboxylic acids. Esters of carboxylic acids and dicarboxylic acids may contain one or more C1-C6 alkyl groups (e.g., methyl, ethyl, propyl, iso-propyl, butyl, iso-butyl, tert-butyl, pentyl, hexyl and mixtures thereof) in the ester unit, for example, dimethyl terephthalate (DMT).

The polyester starting material of the invention may include, but are not limited to, polyester synthesized from aliphatic, aromatic or cyclic (aliphatic or aromatic) dicarboxylic acids, or an aliphatic, aromatic or cyclic (aliphatic or aromatic) ester, with an aromatic, aliphatic or cyclic (aliphatic or aromatic) diol; or an esters prepared from two or more aliphatic, aromatic or cyclic (aliphatic or aromatic) esters. Examples of polyesters include, but are not limited to, polyethylene terephthalate, polyethylene naphthalate, polyethylene isophthalate, polypropylene terephthalate, polybutylene terephthalate, poly(1,4-cyclohexylene dimethylene terephthalate) and polyethylene-2,6-naphthalene dicarboxylate, and mixtures thereof. Copolymers, blends and mixtures thereof are also included. Preferred embodiments of the present invention use polyethylene terephthalate polymers having copolymerized therewith from 0 to 5 wt % of isophthalic acid (or the dialkyl isophthalate counterpart, depending on whether the polyester is produced from a terephthalic acid or dimethyl (or dialkyl) terephthalate based process) and from 1 to 3 wt % of diethylene glycol.

Dicarboxylic acids include, but are not limited to, aromatic dicarboxylic acids, such as terephthalic acid, isophthalic acid, phthalic acid and 2,6-naphthalenedicarboxylic acid; aliphatic dicarboxylic acids, such as adipic acid, azelaic acid, sebacic acid and decanedicarboxylic acid; and alicyclic dicarboxylic acids, such as cyclohexanedicarboxylic acid. Diols include, but are not limited to, aliphatic diols such as 1,4-butanediol, 1,3-propanediol, 1,6-hexanediol, monoethylene glycol, diethylene glycol, triethylene glycol and polyethylene glycol; alicyclic diols, such as 1,4-cyclohexanedimethanol; and aromatic diols such as bisphenol A. These diacids and diols may be used alone or in combination of two or more.

Other polyester components include, but are not limited to, phthalic anhydride, trimellitic acid, pyromellitic acid, dimeric acid and 5-sodiumsulfoisophthalic acid.

Suitable catalysts can be any catalyst for polymerizing polyesters, including, but not limited to, catalysts based on antimony, titanium, germanium, zinc or combinations thereof.

The ultra-high IV polyester ePET resin may be produced by solid-state polymerization (SSP) of a starting resin having an IV of 0.65 to 0.90, preferably 0.70 to 0.85, more preferably 0.72 to 0.80, that is prepared by a melt process meeting one or more conditions selected from the group consisting of (i) without solid state polymerization, (ii) high IV melt polycondensation, (iii) having underwater pelletizing and (iv) having direct latent heat crystallization, such as that described in U.S. Published Application 2007/0128389 and U.S. Published Application 2007/0248778, the entire contents of each of which are hereby incorporated by reference.

The SSP may include several individual reactors and/or processing stations. For example, the SSP may include a pre-crystallization step wherein the chips and/or pellets are transformed from an amorphous phase into a crystalline phase. The use of a crystalline phase polyester resin is important in later steps of the SSP because the use of amorphous polyester chips may result in clumping of the pellets since an amorphous state polyester resin may not be sufficiently resistant to adherence between pellets and/or chips. The SSP process further includes a crystallizer (e.g., crystallization step), a pre-heater, a cooler, and an SSP reactor.

The polyester resin may be subjected to SSP to raise the IV to a level of 0.9 or higher, preferably 1.1 or higher, more preferably 1.2 or higher, most preferably 1.3 or higher. The resin preferably contains a level of isophthalate units (as percent of the total starting di-acid monomer) of 1% or higher, preferably 2% or higher, more preferably 3% or higher, most preferably 4% or higher, in order to reduce the crystallinity and enhance the melting characteristics of the resin formed through the SSP process, for example, as that described in U.S. Published Application 2011/0256331, the entire contents of which are hereby incorporated by reference.

The ultra-high IV polyester resins preferably do not typically contain any phthalate plasticizer. Di (2-ethylhexyl) phthalate, or DEHP, is the most commonly used of a group of related chemicals called phthalates or phthalic acid esters. The greatest use of DEHP is as a plasticizer for polyvinyl-chloride (PVC) and other polymers including rubber, cellulose and styrene. PET in general, and ultra-high IV polyester specifically, usually does not contain DEHP or any other plasticizer, and does not require such plasticizers for effective use of the polyester. Since phthalate plasticizers, and their use in other conventional resins such as PVC, are coming under increased scrutiny as a potential health hazard in plastic articles, this makes the present invention ultra-high IV polyester a good replacement for such phthalate containing resins in high end molding processes. Additionally, another chemical/monomer that is commonly used in polycarbonates, bisphenol-A, is not an ingredient or component of ultra-high IV PET.

A further advantage of ultra-high IV polyester is that the resulting molded articles (such as gallon size detergent containers) qualify as standard container grade PET and can be readily recycled in the same recycle stream as PET beverage containers bearing the recycling symbol and identifier "1" or "PETE".

Alternatively, the production of a polyester resin such as PET may be carried out directly from a melt phase of the monomer units without any final solid-state polymerization. For example, a batch process may be carried out at a sufficient temperature, for a sufficient time and at a sufficient pressure to drive the polycondensation reaction to completion thus avoiding the need for any subsequent finishing (e.g., final reaction).

Some manufacturing processes do not include an SSP. Processing a polyester resin directly from a melt phase condensation to obtain pre-forms for stretch blow molding applications is described in U.S. Pat. No. 5,968,429 (incorporated herein by reference in its entirety). The polymerization is carried out without an intermediate solidification of the melt phase and permits the continuous production of molded polyester articles (e.g., pre-forms), from a continuous melt phase reaction of the starting monomers.

PET or other polyester resins are known to have hygroscopic behavior (e.g., absorb water from the atmosphere), so pellets obtained by cutting water-quenched strands contain significant quantities of water. Conventionally, the pellets may be dried by passing dry air over the pellets or by heating. Unless previously crystallized, heating for an extended period at an elevated temperature may lead to problems because the amorphous polyester (e.g., PET) pellets may have a tendency to stick to one another.

Because of the challenge of achieving high IV with PET based polyesters in a cost effective, time-efficient manner, and due to the increased crystallinity that often results from the thermal history, PET resins have typically been limited to use in injection stretch blow molding to prepare articles such as soda containers or other thin wall containers, while thicker walled articles, such as "handleware", have typically been formed by EBM with PETG copolymer, PC, PS, PVC, PE, or PP resins, due to the ability to achieve high enough IV and melt strength with the requisite characteristics, at acceptable cost.

"Handleware" is the term used for thicker walled containers (thickness of container wall being 16-55 mils) typically having handles (with handles typically having thickness of 17-40 mils), such as juice, milk, or laundry detergent containers, and other such containers. The details of a typical "handleware" are shown in FIGS. 3, 4, 5, and 6.

In the production of EBM articles such as handleware, one problem encountered with previous attempts to use polyesters was the inability to achieve the high IV levels necessary without a concurrent increase in crystallinity, which results in poor resin melting characteristics as well as the potential for rapid re-crystallization and haze formation during the cooling of the EBM article. However, clear EBM articles, particularly clear handleware, can be formed from conventional polyester resin compositions with the use of ultra-high IV polyesters, without the formation of this crystalline haze.

The EBM processing may be carried out on a polyester resin that is dried or undried. A dried polyester resin is a crystallized resin that has been heated in its solid state to a temperature above the glass transition temperature in a dehumidifying environment. A dried polyester resin contains less than 1,000 ppm, preferably less than 500 ppm, more preferably less than 50 ppm, especially preferably less than 25 ppm of water based upon the weight of the water relative to the total weight of the resin. Drying may also be accomplished by exposing the polyester resin to a dehumidified atmosphere to thereby remove water adsorbed or absorbed by the polyester resin.

Undried polyester resin may be a polyester resin that contains water or a resin that is free of water. A resin that is free of water may be one that is obtained by solidifying a polyester resin liquid obtained directly from a polyester polymerization process in an atmosphere that is substantially free of water (e.g., substantially free of water includes atmospheres that have 99%, preferably 99.5%, more preferably 99.9% by volume free of water vapor). Thus, an undried polyester resin may be one that has not undergone heating in the solid state.

An undried polyester resin may be one that is obtained in the solid form from a polyester polymerization process then stored in an atmosphere that is not inert and/or not dried (e.g., dehumidified). Water vapor present in the atmosphere may absorb onto the surface of the polyester resin and/or may absorb into the matrix of the polyester resin. An amount of water of as much as 5% by weight based upon the weight of the water relative to the total weight of the resin may be present. Preferably, the polyester resin used in the method of the invention is an undried water-free resin or a dried resin.

In a preferred embodiment, the solid form ultra-high IV polyester resin is dried before EBM processing. The drying may be carried out in a conventional drier by passing dehumidified air over chips and/or pellets of the solid form polyester resin. Preferably the polyester resin is dried in a dehumidified environment for 2 to 10 hours, more preferably 4 to 8 hours and most preferably about 6 hours. The dehumidified gas passing over the polyester pellets and/or chips has a dew point of less than −10° C., preferably less than −20° C., more preferably less than −40° C., even more preferably less than −50° C., most preferably less than −60° C. The dehumidified gas passing over the polyester pellets has a temperature in the range 220 to 400° F., preferably 260 to 360° F., more preferably 300 to 320° F. The crystallized resin has an advantage over the other amorphous/non-crystallized resins. The crystallized resin can be dried at higher temperatures without agglomerations forming. Other amorphous resins have to be dried at lower temperatures for longer periods of time, thus potentially slowing the EBM cycle time down to allow for proper drying time.

The EBM container formed from the polyester parison is preferably free of haze. The temperature of the extruded parison may be adjusted so that haze is not observed in the EBM article. A parison temperature that is too low during EBM may result in unacceptable material distribution whereas a parison temperature that is too high may result in haze or unacceptable material distribution caused by lack of die swell.

During the EBM manufacture of articles such as bottles, containers, and the like, many individual articles and parts are made that are not of first quality or are otherwise not marketable. It is desirable (if not required) to reuse (e.g., recycle) the resin in such "off-grade" articles. The resin from which off-grade materials are made may be mixed with virgin PET resin to recover to form other articles.

The design of the base section of the container or bottle is another factor that affects the EBM container or bottle drop-impact performance, because the base section, especially in the case of an ePET container, is the location of a vast majority of all drop-impact container failures. However, the handle pinch off section of handleware can also be an initiation source for drop-impact failures. Thus, in certain embodiments the handle section may be textured exclusively or in addition to the base section.

Generally, the container or bottle of the present invention comprises an outlet at a first end, a base portion at a second end, and a body portion located between the outlet and the base. The main body of the container may include an integrally-formed handle. The container further includes a neck, an expansion section, and a shoulder. The neck is located adjacent to the outlet. The shoulder is located adjacent to the main body. The expansion section is located between the neck and shoulder. A chime connects the bottom surface of the base to the body portion.

The base portion at the second end may have a relatively shallow base insert to eliminate the need for an independent base pushup device. In such a case, the base section includes a rocker relief, which creates independent contact sections versus a continuous contact surface along the base chime section. This shallow base insert is designed with a 'relief' area to protect the pinch-off or seam of the container from contacting the standing surface to prevent rocker bottoms and direct impact to the pinch off during drop impacts.

The base portion may include embossing characters and symbols, for instance, the base pushup to depict the cavity number, recycle code, manufacturer's code, other alpha numeric characters for logos and patent pending markings. The article or container may include witness lines depending on the venting technique employed during the EBM process.

Overall, the different geometries resulting from having a base insert, rocker relief, or base pushup device, the presence of the hardened plastic pinch-off or seam, the difference geometries arising from any embossing characters and symbols, and any witness lines from venting techniques, are stress risers that impair the drop-impact resistance and serve as initiation points for drop-impact failure.

The present invention further improves the drop-impact resistance by neutralizing or minimizing the contribution of stress risers, from all potential sources, which may contribute to the initiation of drop-impact failure. Specifically, by texturing the surface of the mold, EBM articles or containers or bottles produced from the sandblasted mold have a surface profile having an increased surface area and thickness. At the same time, the texturing of the mold base section (and therefore the EBM container base surface) creates radii on all sharp corners/edges created from embossing or intersection of the various geometric surfaces. By softening these sharp edges, the present invention reduces any stress concentration by allowing the ePET plastic forming the container base to bend across a radius (or multiple radii) versus bending across sharp corners and/or intersections of an un-textured container. Additionally, sandblasting the flat base surface of the mold also improves the flexibility of the flat EBM container base surface by providing a surface geometry resembling accordion bellows. Such an accordion profile on the flat container base allows addition flex across its surface geometry during bending of the cross-section during drop impact by the hydrostatic pressure of the contents in comparison to a flat rigid untreated surface produced from a polished mold surface.

The various types of materials used in mold construction can affect texture appearance. In the present invention, the mold materials include, but are not limited to, pre-hardened tool steels, aluminum alloy, or stainless steel. In one embodiment, the mold material is a pre-hardened tool steel having USN Alloy No. CSM-2 or P-20. In an alternative embodiment, the mold is composed aluminum alloy. Preferred aluminums alloy grades are 7075-T6 and QC-7, which exhibit good thermal conductivity. The mold be also be comprised of beryllium-copper alloy or include beryllium-copper alloy inserts for neck insert, handle areas, and pinch offs for more efficient cooling. Preferably, the beryllium-copper alloy is a Be—Cu alloy 165 or Be—Cu alloy 25, which display medium to good thermal conductivity with good durability when used in the high-hardness range. Stainless steels such as 17-4 and 420 are also suitable for mold materials. In addition, heat-treated A-2 steel may be included as an insert in pinch offs.

In the present invention, the mold is preferably textured by sandblasting. While it is possible to texture or sandblast the container or bottle directly rather than via the surface of the mold, sandblasting the finish plastic part is not necessarily practical. In fact, sandblasting the final product causes the opposite effect provided by the present invention. Specifically, sandblasting the final product removes polymer material, which causes a thinner cross section in the blasted areas. Due to the thinner cross sections the textured surface is weakened. Accordingly, the present invention is carried out by sandblasting the mold rather than the finished article.

In a preferred embodiment only the base section of the mold, including the chime, is sandblasted. Most preferably, the texturing is performed on the base section of the mold up to a point in the mold where the surface creates what would be an approximately vertical exterior wall of the article or container or bottle.

Preferably, the base of the article or container is not coated or otherwise modified. That is, the textured surface of the container is the final surface of the container or bottle and is not further modified by filling or coating of the textured surface with another polymer material or resin.

The grain size for sandblasting the mold surface depends on the required surface conditions to be obtained. The terms "shot" and "grit" are used to describe the shape of the granules: round and angular, respectively. In the present invention, the grain (grit) sizes range in order of general to more preferred: from 16 to 220, from 16 to 180, from 16 to 150, from 16 to 100, from 16 to 90, from 16 to 80, from 16 to 70, from 16 to 60, from 16 to 54. In a preferred embodiment, the grain sizes are course and in the range of 16 to 46, more preferably from 20 to 40, even more preferably from 20 to 36, still more preferably from 20 to 30, and most preferably form 20 to 24. In an alternative embodiment, the grain sizes are finer and range from, for instance, 54 to 220, preferably from 60 to 180, more preferably from 70 to 150. A plurality of distinct grain sizes may be employed. In one embodiment, a courser grain size of 16 to 30, preferably from 20 to 24, most preferably of 24, is employed in combination with a finer grain size ranging from 40 to 80, preferably from 46 to 60, or most preferably from 54 to 60.

The sandblasting media (or abrasive media) is not restricted so long as it provides a sufficient texture to achieve the effects of the present invention. The sandblasting materials of the present inventions may include, but are not limited to, carborundum, quartz, corundum (aluminum oxide), silica sand, glass beads, silicon carbide, walnut shells, steel grit, or mixtures thereof. Preferred embodiments of the present invention use at least one of silica, aluminum oxide, and silicon carbide as the sandblasting material. Preferably, the sandblasting material is a combination of silica sand and aluminum oxide such as BLACK BEAUTY®.

Figure 2A:
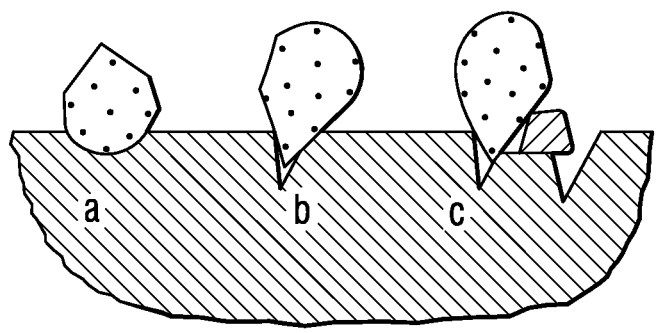
FIG. 2A shows a schematic of the mold surface texturing obtained by sandblasting with abrasive media.
Figure 2B:
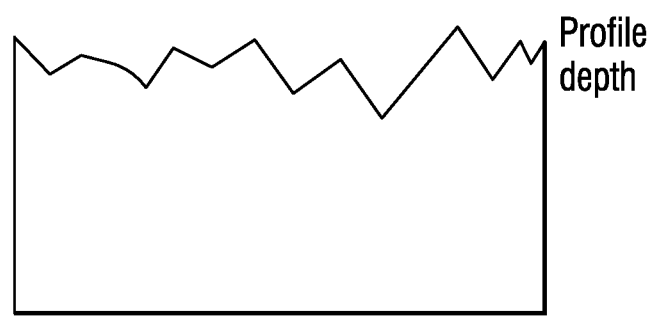
FIG. 2B shows a profile depth of an EBM container surface prepared in a mold having a textured surface.
Figure 3:
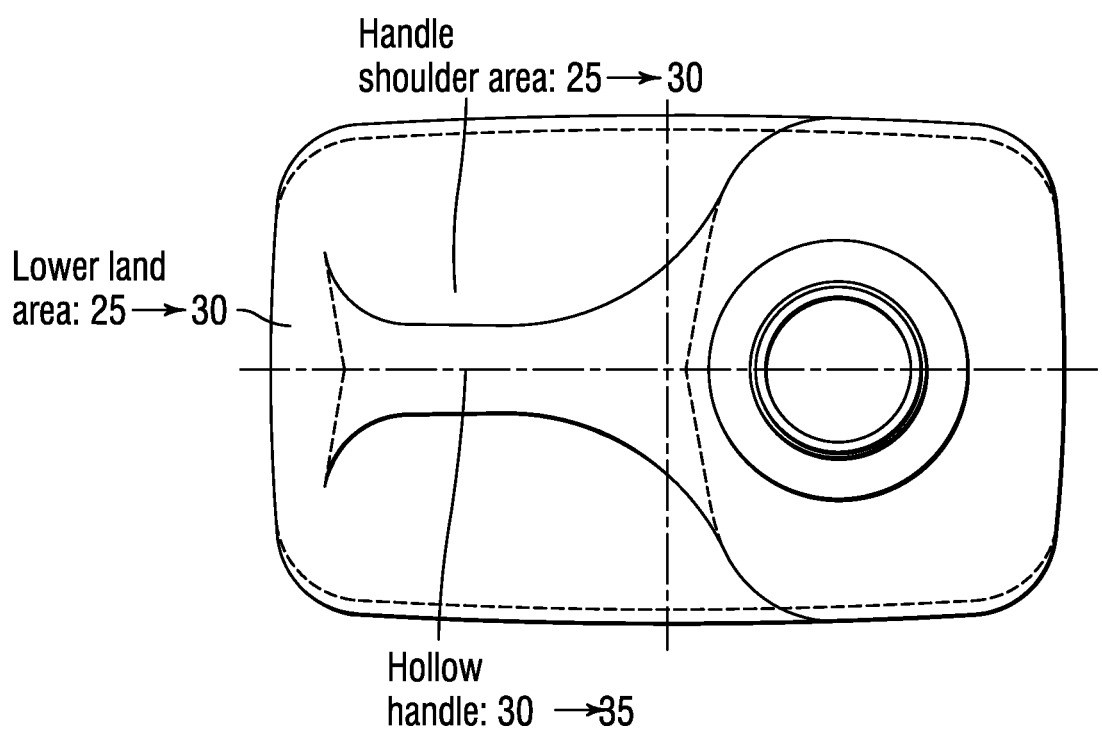
FIG. 3 provides a top view of typical wall material thickness distribution in a 128 oz. container manufactured by an extrusion blow molding process. Container weight 150±4 grams. All dimensions in mils.
Figure 4:
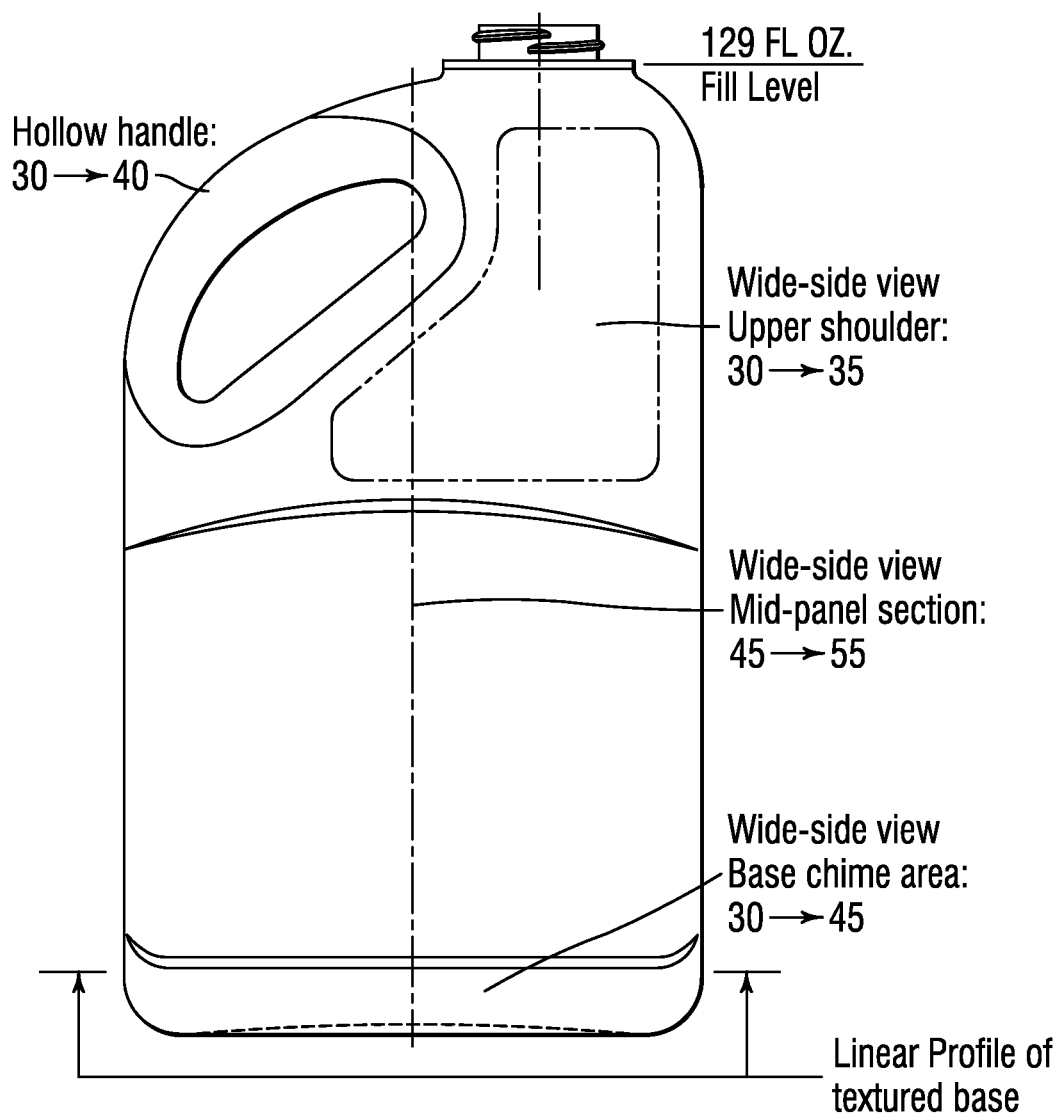
FIG. 4 provides a wide side view of typical wall material thickness distribution in a 128 oz. container manufactured by an extrusion blow molding process including a linear profile of the textured area, which is defined as the intersection of the chime and the vertical side wall. Container weight 150±4 grams. All dimensions in mils.
Figure 5:
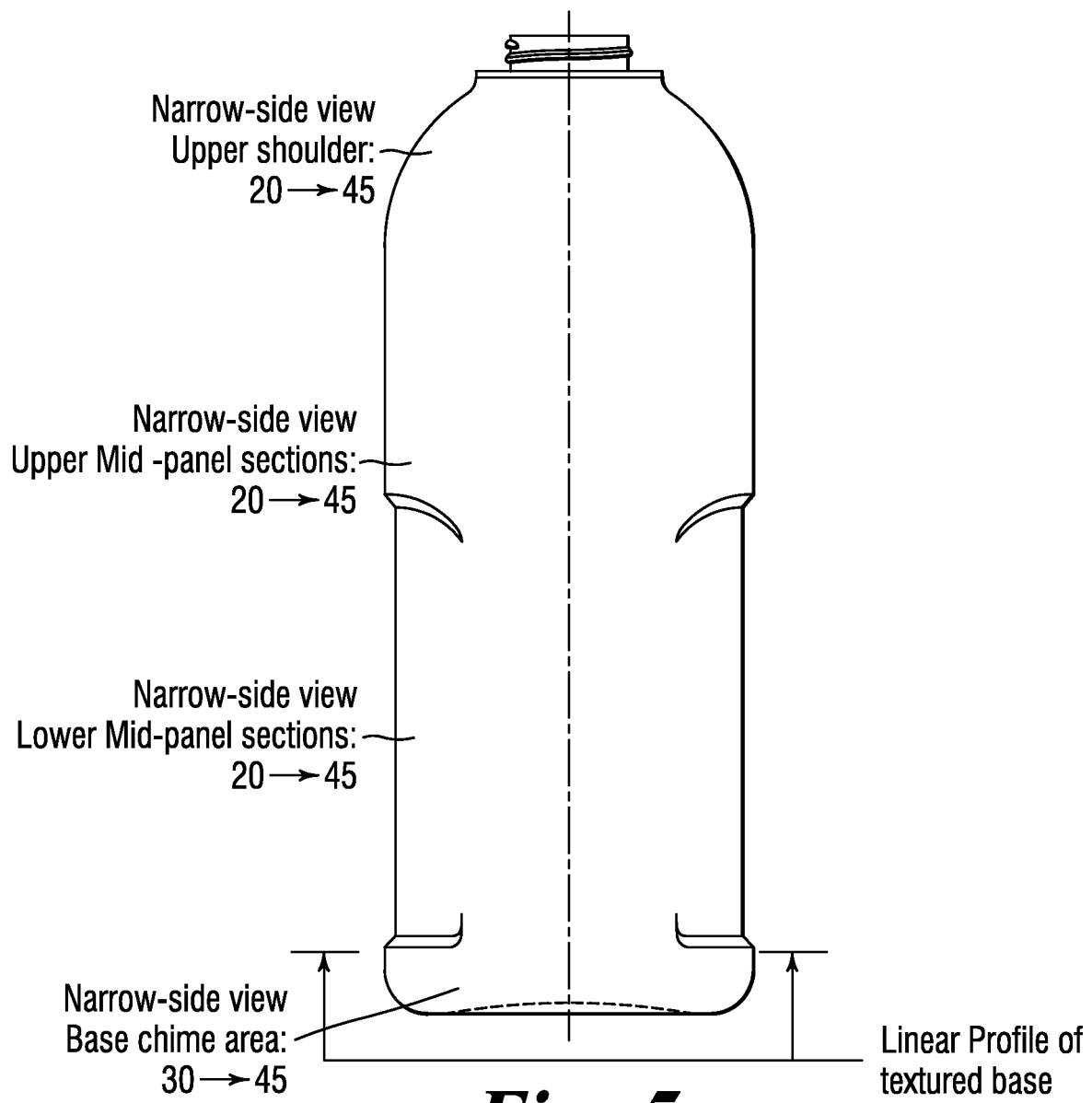
FIG. 5 provides narrow side view of typical wall material thickness distribution in a 128 oz. container manufactured by an extrusion blow molding process including the linear profile of the texture on the chime of the bottle. Container weight 150±4 grams. All dimensions in mils.
Figure 6:
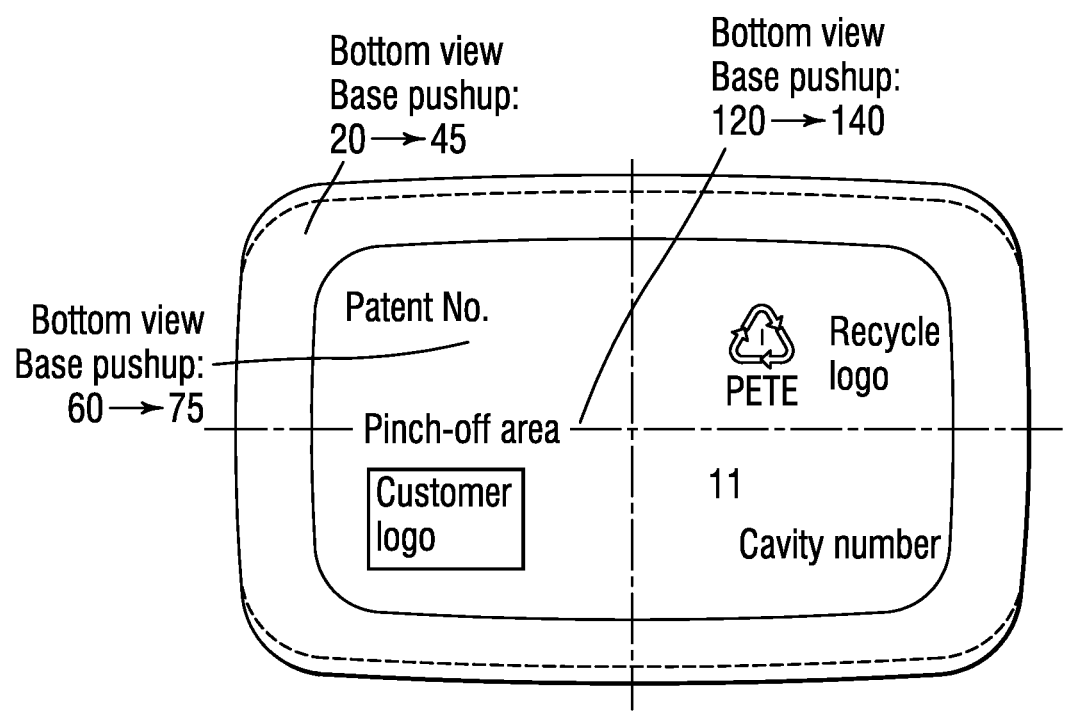
FIG. 6 provides a bottom view of typical wall material thickness distribution in a 128 oz. container manufactured by an extrusion blow molding process. Container weight 150±4 grams. All dimensions in mils.
Figure 7:
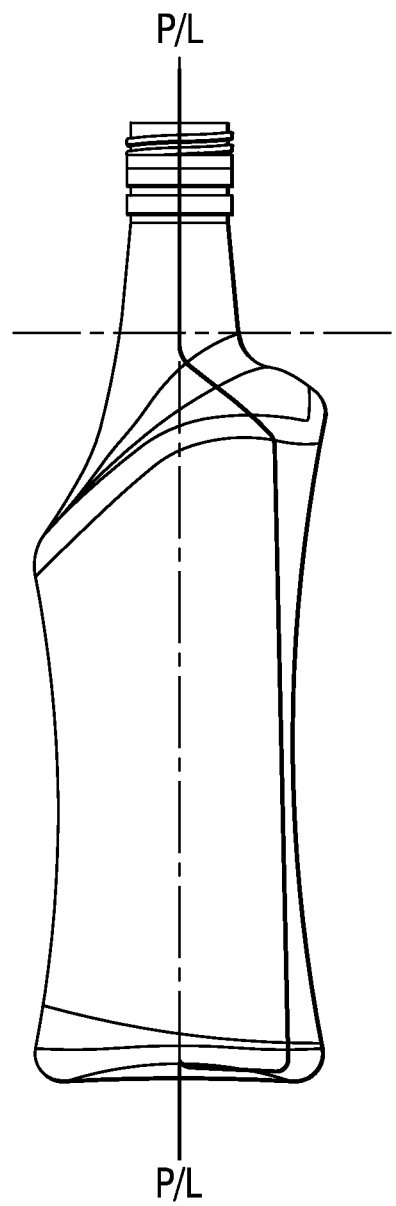
FIG. 7 provides alternate side views of a 1.75 L container having a textured chime and base section.
Figure 8A:
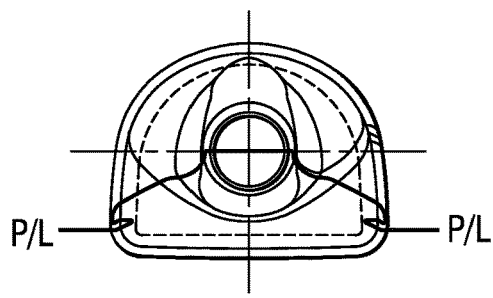
FIG. 8 provides front and side views of a 1.75 L container having a textured chime and base section.
Figure 8B:
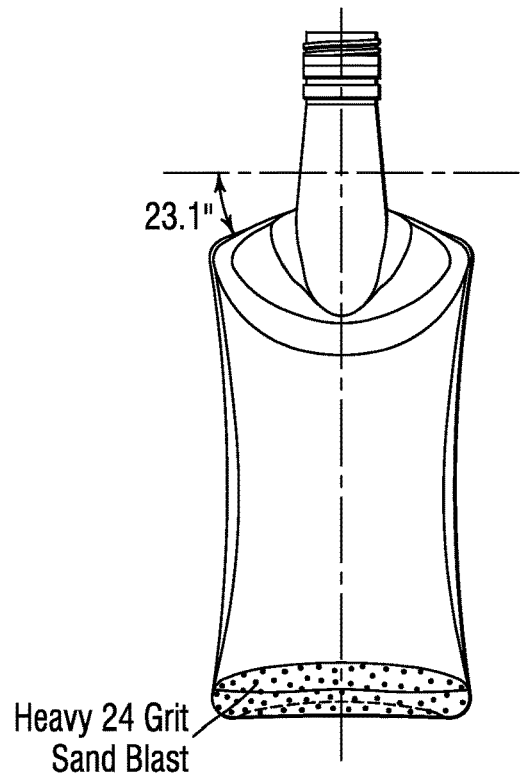
Figure 8C:
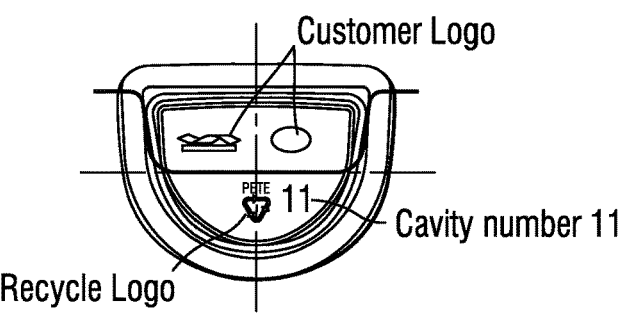

The depth of the incisions depends on the grit size, and type of metal, but is also influenced by the speed and physical characteristics of the abrasive material (shape, hardness and specific weight). Generally, as the density of the metal increases, there is less texture depth for a given sand blast media. With grit size and blasting speed being equal, angular metallic grits result in deeper incisions as shown in FIG. 2.

The profile of the surface should be sufficient to soften any sharp edges that would otherwise be present on the EBM container base surface. The blast angle during the sandblasting is typically within the range from 75 to 105 degrees. Generally, the speed and abrasive material are selected to provide a surface profile ranging from 1 to 4.5 mils, preferably from 1.5 to 3 mils, more preferably from 2 to 30 mils. The selection of sandblasting materials and conditions is well within the knowledge of one of ordinary skill in the art.

The blast media type, shape, size, density, and hardness, along with media acceleration and volume of media, combines with blasting distance from the work piece, angle of impact and time cycles are important factions in the blast process capabilities.

The invention claimed is:

1. A method for improving the impact resistance of an extrusion blow molded bottle, the method comprising:
   extrusion blow molding an ultra-high IV polyethylene terephthalate resin having an IV of at least 0.9 dL/g, to obtain a extrusion blow molded bottle comprising
      an outlet at a first end,
      a base portion at a second end, wherein the base portion includes a base insert at least partially recessed into the extrusion blow molded bottle, wherein the base insert is embossed with a plurality of characters and symbols,
      a body portion located between the outlet and the base having a lower panel, a mid panel and an upper panel,
      a shoulder portion connecting the upper panel to the outlet at the first end, and
      a chime connecting the lower panel of the body portion and the base portion,
   wherein the extrusion blow molding is carried out in a mold with a texturized base surface and a texturized chime surface such that a base surface of the base portion of the extrusion blow molded article and a chime surface of the chime portion of the of the extrusion blow molded bottle are textured, and wherein the body portion and the shoulder portion of the mold are polished;
   wherein the lower panel, the mid panel, the upper panel and the shoulder portion of the extrusion blow molded bottle are clear, and the base portion and the chime portion of the extrusion blow molded bottle are textured; and
   wherein the texturized base surface and the texturized chime surface of the mold are formed by sand blasting the mold with angular grains having a grit size in the range from 16 to 220.

2. The method of claim 1, wherein the ultra-high IV polyethylene terephthalate resin has an IV of at least 1.1 dL/g.

3. The method of claim 1, wherein the ultra-high IV polyethylene terephthalate resin has an IV of at least 1.3 dL/g.

4. The method of claim 1, wherein the grit size is from 16 to 40.

5. The method of claim 1, wherein the grit size is 24 on a stainless steel.

6. The method of claim 1, wherein only the texturized base surface and the texturized chime surface of the mold are sandblasted and the remainder of the mold surface is polished.

7. The method of claim 1, wherein the mold is made of a pre-hardened tool steel or an aluminum alloy.

8. The method of claim 7, wherein the mold is made of the pre-hardened tool steel and the pre-hardened tool steel is CSM-2 or P-20.

9. The method of claim 7, wherein the mold is made of the aluminum alloy and the aluminum alloy is 7075-T6 and QC-7.

10. A method for producing an extrusion blow molded bottle, the method comprising:
    extrusion blow molding an ultra-high IV polyethylene terephthalate resin having an IV of at least 0.9 dL/g, to obtain a extrusion blow molded bottle comprising
       an outlet at a first end,
       a base portion at a second end wherein the base portion includes a base inert at least partially recessed into the cavity of the extrusion blow molded bottle, wherein the base insert is embossed with a plurality of characters and symbols,
       a body portion located between the outlet and the base having a lower panel, a mid panel and an upper panel,
       a shoulder portion connecting the upper panel to the outlet at the first end, and
       a chime connecting the lower panel of the body portion and the base portion,
    wherein the extrusion blow molding is carried out in a mold with a texturized base surface and a texturized chime surface such that a base surface of the base portion of the extrusion blow molded article and a chime surface of the chime portion of the of the extrusion blow molded bottle are textured, and wherein the body portion and the shoulder portion of the mold are polished;
    wherein the lower panel, the mid panel, the upper panel and the shoulder portion of the extrusion blow molded bottle are clear, and the base portion and the chime portion of the extrusion blow molded bottle are textured; and
    wherein the texturized base surface and the texturized chime surface of the mold are formed by sand blasting the mold with angular grains having a grit size in the range from 16 to 220.

11. A molded bottle obtained by the method of claim 10.

12. The method of claim 10, wherein the ultra-high IV polyethylene terephthalate resin has an IV of at least 1.1 dL/g.

13. The method of claim 10, wherein the ultra-high IV polyethylene terephthalate resin has an IV of at least 1.3 dL/g.

14. The method of claim 10, wherein the grit size is from 16 to 40.

15. The method of claim 10, wherein the grit size is 24 on a stainless steel.

16. The method of claim 10, wherein only the texturized base surface and the texturized chime surface of the mold are sandblasted and the remainder of the mold surface is polished.

17. The method of claim 10, wherein the mold is made of a pre-hardened tool steel or an aluminum alloy.

18. The method of claim 17, wherein the mold is made of the pre-hardened tool steel and the pre-hardened tool steel is CSM-2 or P-20.

19. The method of claim 17, wherein the mold is made of the aluminum alloy and the aluminum alloy is 7075-T6 and QC-7.

\* \* \* \* \*